(12) United States Patent
Grange et al.

(10) Patent No.: US 10,319,072 B2
(45) Date of Patent: Jun. 11, 2019

(54) ADAPTATION OF PRESENTATION SPEED

(71) Applicant: GOOGLE LLC, Mountain View, CA (US)

(72) Inventors: Adrian Grange, Los Gatos, CA (US); Jamieson Brettle, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/727,915

(22) Filed: Oct. 9, 2017

(65) Prior Publication Data

US 2019/0108614 A1 Apr. 11, 2019

(51) Int. Cl.

| G06F 3/00 | (2006.01) |
|---|---|
| G06F 3/01 | (2006.01) |
| G06T 3/20 | (2006.01) |
| G06F 3/16 | (2006.01) |

(52) U.S. Cl.
CPC ........... *G06T 3/20* (2013.01); *G06F 3/013* (2013.01); *G06F 3/165* (2013.01)

(58) Field of Classification Search
CPC ...................................................... G06T 3/20
USPC ...................................................... 345/672
See application file for complete search history.

(56) References Cited

U.S. PATENT DOCUMENTS

| 5,767,795 A | 6/1998 | Schaphorst |
| 6,085,148 A | 7/2000 | Jamison et al. |
| 8,838,382 B2 | 9/2014 | Drysdale |
| 8,885,882 B1* | 11/2014 | Yin .......................... G06F 3/00 382/103 |
| 9,606,622 B1 | 3/2017 | Brothers et al. |
| 2005/0193343 A1* | 9/2005 | Kawabe ................. G06F 3/048 715/716 |
| 2005/0219055 A1 | 10/2005 | Takai et al. |
| 2005/0221268 A1* | 10/2005 | Chaar ...................... G09B 7/02 434/350 |
| 2007/0165019 A1* | 7/2007 | Hale ...................... G06Q 10/00 345/418 |
| 2008/0188354 A1 | 8/2008 | Pauws et al. |
| 2010/0172287 A1* | 7/2010 | Krieter .................. H04W 8/005 370/328 |
| 2013/0021373 A1 | 1/2013 | Vaught et al. |
| 2014/0146075 A1 | 5/2014 | Takasu |
| 2016/0006721 A1* | 1/2016 | Patel ................... H04L 63/0815 726/8 |

OTHER PUBLICATIONS

IntelliPrompter offers Mac-based text prompting, by Dennis Sellers, PCWorld , Aug. 21, 2003.*

(Continued)

*Primary Examiner* — Javid A Amini
(74) *Attorney, Agent, or Firm* — Young Basile Hanlon & MacFarlane, P.C.

(57) ABSTRACT

Systems and methods are disclosed for adaptation of presentation speed for content presentation (e.g., audio content presentation). For example, methods may include obtaining an indication of motion in a space; adjusting a presentation speed based on the indication of motion; and presenting a content item associated with a location in the space, wherein the content item is presented using the adjusted presentation speed.

20 Claims, 7 Drawing Sheets

(56) References Cited

OTHER PUBLICATIONS

IntelliPrompter: Speech-Based Dynamic Note Display Interface for Oral Presentations, by Reza Asadi, Ha Trinh, Harriet J. Fell, and Timothy W. Bickmore, 2017 Copyright is held by the owner/author(s). Publication rights licensed to ACM.*
Bankoski, et al., "Technical Overview of VP8, An Open Source Video Codec for the Web", Jul. 11, 2011, 6 pp.
Bankoski et al., "VP8 Data Format and Decoding Guide", Independent Submission RFC 6389, Nov. 2011, 305 pp.
Bankoski et al, "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.
Combined Search and Examination Report in corresponding foreign Application No. GB1621882.8, dated May 26, 2017.
International Search Report and Written Opinion in PCT/US2018/041814, dated Oct. 11, 2018, 14 pgs.

* cited by examiner

ADAPTATION OF PRESENTATION SPEED

BACKGROUND

Augmented reality applications allow a user to see a presentation of the world augmented with or superimposed by computer-generated content. The content may be graphical, textual, and/or audible. The presented world may be presented directly to the user, such as when the user is looking through a display, and the imagery is applied to or projected on the display. The world may also be presented indirectly, such as when a user is navigating previously captured images of the real world, rather than the world that is presently in front of the user.

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD"), since the user can view the CGI without taking their eyes off their forward view of the world.

SUMMARY

This application relates to adaptation of presentation speed for content items associated with locations. Disclosed herein are aspects of systems, methods, and apparatuses for adapting presentation speed for content items associated with locations.

One aspect of the disclosed implementations is a system for audio presentation. The system includes a motion sensor, a speaker, a memory, and a processor. The memory stores instructions executable by the processor to cause the system to: obtain, from the motion sensor, an indication of motion in a space; adjust a presentation speed based on the indication of motion; and present, via the speaker, an audio content associated with a location in the space, wherein the audio content is presented using the adjusted presentation speed.

Another aspect is a method for content presentation. The method includes obtaining an indication of motion in a space; adjusting a presentation speed based on the indication of motion; and presenting a content item associated with a location in the space, wherein the content item is presented using the adjusted presentation speed.

Another aspect is a system for content presentation. The system includes a memory and a processor. The memory stores instructions executable by the processor to cause the system to: obtain an indication of motion in a space; adjust a presentation speed based on the indication of motion; and present a content item associated with a location in the space, wherein the content item is presented using the adjusted presentation speed.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
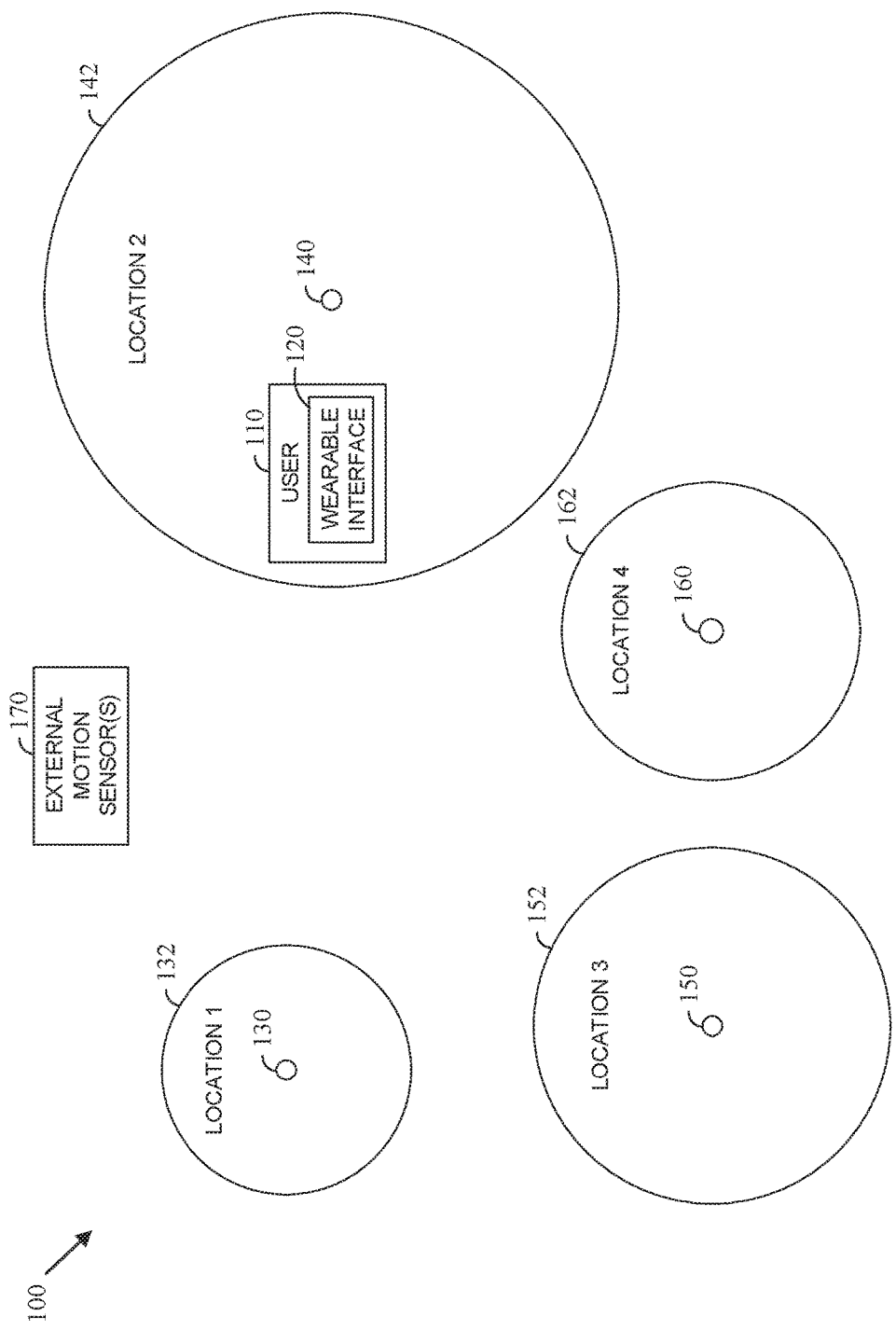
FIG. 1 is a diagram of an example of a space with locations associated with content items for presentation.

In an augmented reality (AR) or virtual reality (VR) setting, audio presentation can be guided based on detected physical or virtual location. For example, the audio track may be changed as a person walks from one room to another as they walk around a museum to match the content of that new room. But walking pace varies from person to person, depending on many factors both physical and circumstantial (e.g., they are in a hurry, they are not interested in the content of a particular room, etc.). If an application is able to estimate the pace that a person is traveling through the physical or virtual environment, it may be used to change the pace of delivery of an accompanying audio track or other content item(s). If a user spends less time or walks briskly past a particular exhibit, the presentation speed of audio content can be accelerated or even stopped until the person returns to a more natural walking pace. There may be limits on how much faster the audio can be presented and remain intelligible. To make the presentation of audio content sound more natural when it is accelerated from a default presentation speed, pitch normalization processing may be applied to the audio content.

The presentation speed for other types of content items (e.g., video or slideshow content) may also be adjusted based on an indication of motion of a user in a space (e.g., a real space or a virtual space). In some implementations, the visual content is presented synchronously with audio content and the presentation speed for all the content items may be adjusted together.

Content items presented to a user may be associated with respective locations in a space. The user moving into proximity to a location may trigger the initiation of the presentation of a content item associated with the location. The presentation speed for the content item may be adjusted at the start of the presentation and/or the presentation speed may continue to be adjusted as the content item is presented. When a presentation speed is adjusted after the content item has started playing, the presentation speed may be updated gradually by interpolating the presentation speed between a current value and an adjusted value in small increments over an interval of time to avoid an abrupt change in presentation speed that could be noticeable and disruptive.

For example, the presentation speed for a content item may be adjusted based on a ratio of time spent in proximity to one or more prior locations visited by the user and durations of respective prior content items for those prior locations. The presentation speed for a content item may be adjusted within a limited range (e.g., between 1× and 2× a default presentation speed for the content item). Additional information about the attention of a user, such as a gaze angle of the user, may also be used to adjust a presentation speed for content items (e.g., including audio content).

Some implementations may provide advantages over prior augmented reality or virtual reality systems, such as tailoring content items to an individual user's interests and behavioral patterns automatically. Some implementations may streamline user interactions and make those interactions faster.

FIG. 1 is a diagram of an example of a space 100 with locations associated with content items for presentation. A user 110 moves in the space 100. The user 110 wears a wearable interface 120 that is configured to present content items (e.g., audio content, video content, or slideshow content) to the user 110. The space includes a first location 130 with a first proximity zone 132 around it, a second location 140 with a second proximity zone 142 around it, a third location 150 with a third proximity zone 152 around it, and a fourth location 160 with a fourth proximity zone 162 around it. One or more external motion sensors 170 are also positioned in the space 100 and are configured to detect motion of the user 110 in the space 100.

For example, the space 100 may be in a museum and the locations (130, 140, 150, and 160) may be associated with respective exhibits in the museum. The locations may be associated with respective content items (e.g., audio content, video content, or slideshow content that expound on a respective exhibit). A content item associated with one of the locations (e.g., the first location 130, the second location 140, the third location 150, or the fourth location 160) may be presented to the user 110 via the wearable interface 120 when the user 110 is in proximity to the location. A presentation speed for the content item may be adjusted based on an indication of motion of the user 110 in the space 100.

The wearable interface 120 may include headphones or another type of speaker for presenting audio content. In some implementations, the wearable interface 120 includes a wearable display (e.g., an HMD) configured to display images to the user 110 for presenting video content, slideshow content, etc. The wearable interface 120 may include motion sensors (e.g., accelerometers, gyroscopes, magnetometers, and/or a global positioning system receiver) for detecting motion of the user 110 through the space 100. The wearable interface 120 may include an eye tracking sensor for detecting a gaze direction of the user 110. For example, the wearable interface 120 may include the computing device 200 of FIG. 2.

The proximity zones (132, 142, 152, and 162) may be defined as circular areas with configured radii centered at respective locations (130, 140, 150, and 162). For example, the radii determining the size of the proximity zones (132, 142, 152, and 162) may be configured by a curator that provides the content items associated with the respective locations (130, 140, 150, and 162).

The external motion sensors 170 may include one or more cameras configured to capture images of the user 110 as the user moves through the space 100. An estimate of motion of the user 110 in the space 100 may be determined based on image data from one or more cameras of the external motion sensors 170. A presentation speed of a content item associated with a location (e.g., the second location 140) may be adjusted based on the estimate of motion of the user 110 in the space 100. For example, a computing device configured to adjust the presentation speed for the content item may receive image data from a camera of the external motion sensors 170. The image data may include views of the user 110 moving in the space 100. The computing device may determine an estimate of motion of the user 110 in the space 100 based on the image data. This estimate of motion may in turn be used to determine an adjustment to the presentation speed.

Consider a space with N exhibits respectively associated with locations in the space (e.g., the first location 130, the second location 140, the third location 150, and the fourth location 160 in the space 100). These exhibits can be notated by the index $i \in (0, \ldots N-1)$. The space can span a single room or multiple rooms. A location (e.g., the second location 140) associated with an exhibit has position coordinates of $(x\_i, y\_i)$. A proximity zone (e.g., the second proximity zone 142) may be configured for the location as a circular region with radius $r\_i$ centered at the location's position coordinates $(x\_i, y\_i)$.

A content item (e.g., an audio track) for exhibit i has a duration, $d\_i$. The content item may be presented at a presentation speed, $v\_i$ (e.g., $v\_i=1 \Rightarrow$ normal speed, $v\_i=2 \Rightarrow$ twice playback speed, etc.).

Let $t\_i$ be the time spent by the user 110 in a proximity zone of the ith exhibit/location. If the user 110 spends more time, $t\_i$, in a proximity zone than the duration of the corresponding content item, $d\_i$, one could infer that time was not an issue. However, if $t\_i < d\_i$ one can infer that the visitor was not interested in this exhibit, or they got bored with the presentation of the content item. Other cues may be used to differentiate these cases. For example, a gaze direction of the user 110 could be monitored to see if the user 110 is looking elsewhere. For example, the user 110 may be deemed to be interested in an exhibit, where they spend time reading an explanation placard of the exhibit. In some scenarios, the presentation speeds for content items of current and/or future exhibits may be increased in an attempt to retain the interest of the user 110.

An example scheme for adjusting presentation speed of content items is:
- For all exhibits visited so far where we determine that the user 110 is interested, calculate the proportion of the respective content item (e.g., audio track) that they listened to, $P\_i \in (0,1)$.
- Let $P'$ be the average of all $P\_i$ for all the exhibits visited so far.
- Determine a presentation speed for a content item of an exhibit as follows:
- If ($P'<0.5$) $v\_i=2.0$
- else $v\_i=1/P'$ In this scheme, the presentation speed is capped $1.0 <= v\_i <= 2.0$ for audio since double presentation speed may be a sensible upper limit for presentation speed to retain intelligibility.

In some implementations, a dampening mechanism may be used to gradually apply adjustments into the presentation speed update to avoid irritating abrupt changes in presentation speed to the user 110.

Other available sensory information may be utilized to inform the adjustment of the presentation speed of content items. For example, precise positions of the user 110 could be used to infer that other people or objects are impeding a view of an exhibit at a location. For example, a relative position of the user and an exhibit explanation placard together with viewer gaze direction can be used to infer whether they have read/are reading the information on the placard and use this in the decision process.

This scheme is equally applicable in an AR scenario, a VR scenario, or a real-world scenario. The specific sensory information that is available may be different in these cases. In the VR world, positions are known implicitly whereas in the real-world position has to be sensed in some way.

Figure 2:
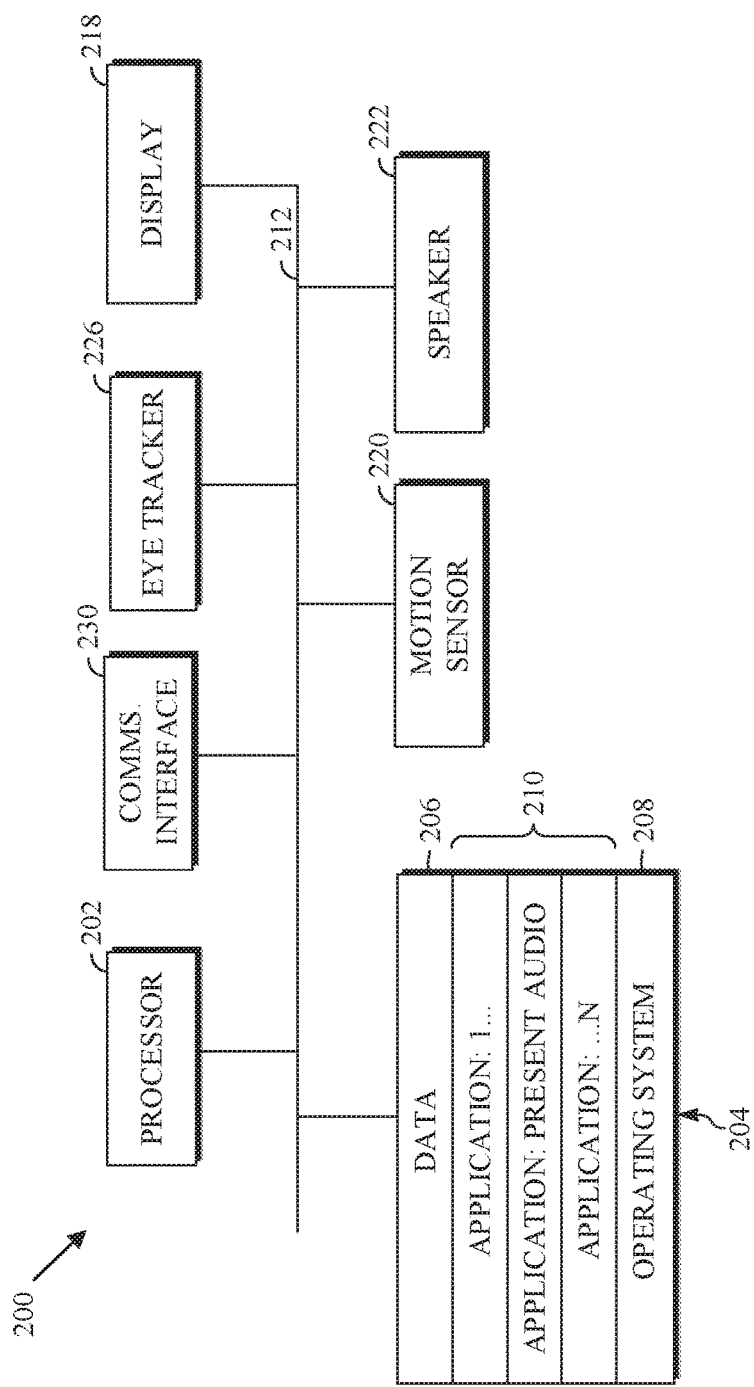
FIG. 2 is a block diagram of an example of a computing device configured to adjust presentation speed of content items based on motion of a user.

FIG. 2 is a block diagram of an example of a computing device 200 configured to adjust presentation speed of content items based on motion of a user. The computing device may include or be part of a system for content presentation (e.g., audio presentation). The computing device 200 can be in the form of a computing system including multiple computing devices, or in the form of a single computing device, for example, a VR headset, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a content item presentation application that performs the methods described here (e.g., implementing the process 300 of FIG. 3).

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display. In some implementations, the display 218 is a wearable display (e.g., an HMD integrated in glasses or goggles).

The computing device 200 can also include or be in communication with a motion sensor 220, for example an inertial measurement unit, or any other motion sensor 220 now existing or hereafter developed that can detect motion of a user in a space. The motion sensor 220 can be configured to be worn by a user operating the computing device 200. For example, the motion sensor 220 may include accelerometers, gyroscopes, magnetometers, and/or a global positioning system receiver.

The computing device 200 can also include or be in communication with a speaker 222, for example headphones, or any other sound-making device now existing or hereafter developed that can generate sounds in response to signals from the computing device 200. The speaker 222 can be positioned such that it is directed toward a user operating the computing device 200 and can be configured to present audio content (e.g., music or an audio track) associated with a location when the user is in proximity to the location. For example, video content may be presented, via the display 218 (e.g., a wearable display), synchronously with audio content presented via the speaker 222.

The computing device 200 can also include or be in communication with an eye tracking sensor 226, for example an optical sensor, or any other eye tracking sensor 226 now existing or hereafter developed that can detect eye orientation or gaze direction. For example, the eye tracking sensor 226 may include a video camera that detects light (e.g., infrared light) reflected from an eye and outputs image data. The image data may be analyzed to determine a relative orientation of the eye. In some implementations, the eye tracking sensor 226 may use electric potentials measured with electrodes placed around the eyes. Electric signal that can be derived using two pairs of contact electrodes placed on the skin around one eye is called an electrooculogram (EOG). For example, an indication of gaze direction for a user may be determined based on an EOG and data describing the position and orientation of a user's head in a space. An indication of gaze direction for a user may be obtained from the eye tracking sensor 226 and a presentation speed for a content item may be determined based in part on the indication of gaze direction.

The computing device 200 can also include a communications interface 230, which may enable communications with a content server and/or external sensors (e.g., the external motion sensors 170). For example, the communications interface 230 may be used to receive image data from a camera. The image data may include views of a user moving in a space. For example, the communications interface 230 may be used to receive content items (e.g., audio content, video content, and/or slideshow content) from a content server for presentation to a user. For example, the communications interface 230 may include a wired interface, such as a high-definition multimedia interface (HDMI), a universal serial bus (USB) interface, or a FireWire interface. For example, the communications interface 230 may include a wireless interface, such as a Bluetooth interface, a ZigBee interface, and/or a Wi-Fi interface.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, secondary storage can be directly coupled to the components of the computing device 200 or can be accessed via a network and can comprise a single integrated unit such as a memory card or multiple units such as multiple memory cards. The computing device 200 can thus be implemented in a wide variety of configurations.

Figure 3:
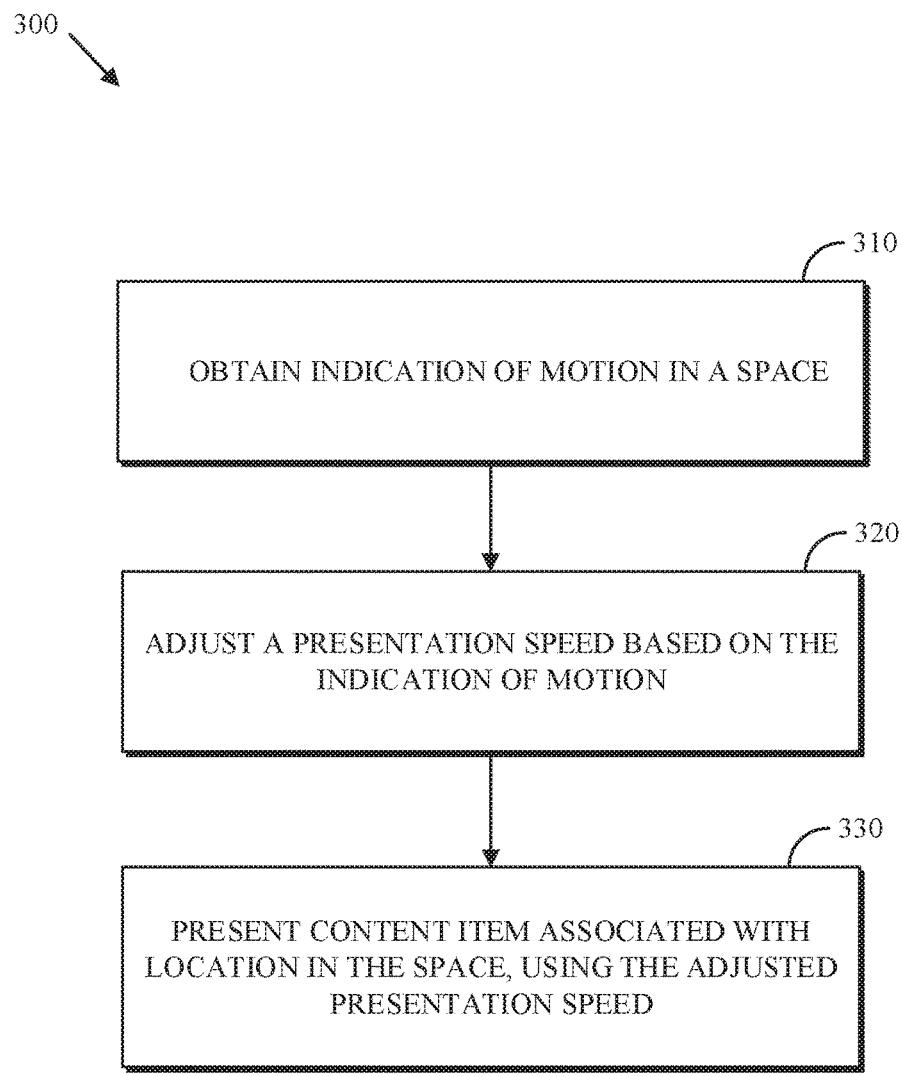
FIG. 3 is a flowchart an example of a process for adapting presentation speed of a content item associated with a location.

FIG. 3 is a flowchart an example of a process 300 for adapting presentation speed of a content item associated with a location. The process 300 includes obtaining 310 an indication of motion in a space; adjusting 320 a presentation speed based on the indication of motion; and presenting 330 a content item associated with a location in the space, wherein the content item is presented using the adjusted presentation speed. For example, the process 300 may be implemented by the wearable interface 120 of FIG. 1. For example, the process 300 may be implemented by the computing device 200 of FIG. 2.

The process 300 includes obtaining 310 an indication of motion in a space. In some implementations, the space may be a real space (e.g., a space in a museum that includes exhibits). For example, the indication of motion may be based on data from motion sensors (e.g., accelerometers, gyroscopes, magnetometers, and/or a global positioning system receiver) worn by a user as the user moves through the space. In some implementations, the space may be a virtual space (e.g., that user moves through using a virtual reality application and control interface). For example, the indication of motion may be based on control signals from a user detected with a virtual reality control interface (e.g., including motion sensors worn by the user, buttons, a mouse, and/or a joystick). The indication of motion may include a position, an orientation, and/or a velocity in the space. In some implementations, the indication of motion may include specification of a path through the space traversed by the user.

The process 300 includes adjusting 320 a presentation speed based on the indication of motion. In some implementations, the presentation speed may be adjusted 320 to present a content item faster when the user is moving through the space faster than expected. For example, when the average velocity of the user in the space over a time interval or as the user moves between two locations is greater than an expected average velocity, the presentation speed may be increased by factor proportional to the excess average velocity. In some implementations, the presentation speed may be adjusted 320 based on analysis of the amount of time the user has spent in proximity to other locations associated with content items. For example, the presentation speed may be adjusted 320 by implementing the process 500 of FIG. 5. Adjusting 320 the presentation speed may include checking that the adjusted presentation speed is less than a limit (e.g., 2× or 3× a default presentation speed for the content item). Enforcing a limit on the presentation speed may serve to preserve intelligibility of the content item.

The process 300 includes presenting 330 a content item associated with a location in the space. The content item may be presented 330 using the adjusted presentation speed. The content item may include at least one of audio content, video content, and slideshow content. For example, content item may include audio content and may be presented 330 by playing the audio content with a speaker (e.g., the speaker 222). When audio content is presented 330 using a presentation speed higher than the default presentation speed for the content item (e.g., playback at 1.5× speed), pitch normalization processing may be applied to the audio content to mitigate distortion of voices in the audio content. For example, content item may include video content and/or slideshow content and may be presented 330 by displaying the video content and/or slideshow content on a display (e.g., the display 218). In some implementations, video content is presented 330, via a wearable display (e.g., an HMD), synchronously with audio content. For example, the content item may be presented 330 when the user is in proximity to the location by using the process 400 of FIG. 4.

Figure 4:
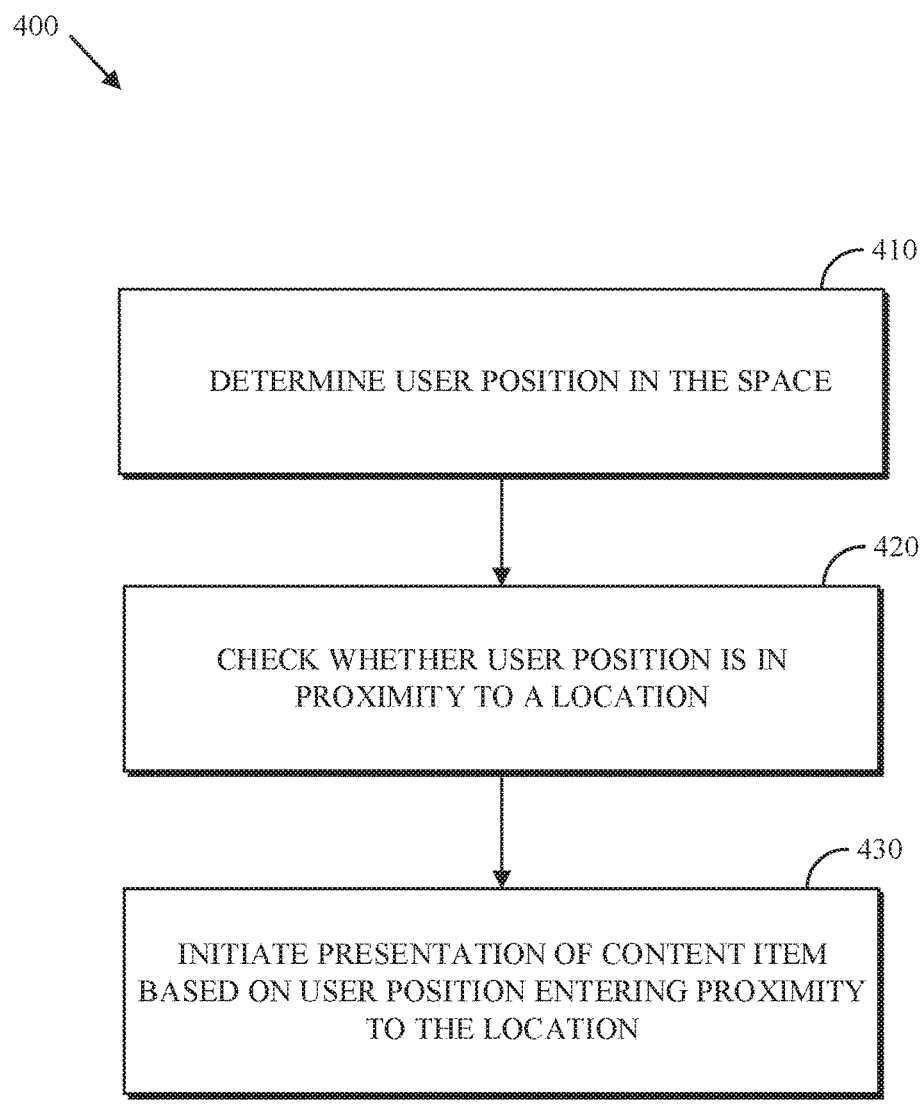
FIG. 4 is a flowchart an example of a process for presenting a content item associated with a location.

FIG. 4 is a flowchart an example of a process 400 for presenting a content item associated with a location. The process 400 includes determining 410 a user position in the space; checking 420 whether the user position is in proximity to the location; and initiating 430 presentation of the content item based on the user position entering proximity to the location. For example, the process 400 may be implemented by the wearable interface 120 of FIG. 1. For example, the process 400 may be implemented by the computing device 200 of FIG. 2.

The process 400 includes determining 410 a user position in the space. For example, the user position may be determined 410 based on coordinates from a global positioning system. In some implementations, the user position in the space may be determined 410 by tracking the evolution of the user's position from a known starting point based on data from motion sensor(s) worn by the user. For example, accelerometer and gyroscope measurements may be integrated to track the evolution of a user position. In a virtual space, the position of the user may be determined 410 by retrieving a position data structure from a virtual reality application being used by the user.

The process 400 includes checking 420 whether the user position is in proximity to a location. For example, checking 420 whether the user position is in proximity to the location may include determining a distance between the user position and the location. If the distance is below a threshold that has been configured for the location (e.g., 1 meter, 5 meters, or 10 meters), then the user is determined to be in proximity to the location. Checking 420 whether the user position is in proximity to the location may include determining whether the user position is within a proximity zone configured for the location. For example, the proximity zone (e.g., the second proximity zone 142) for a location (e.g., the second location 140) may be configured as a circle around the center point of the location. Other shapes may be configured for proximity zones. For example, a proximity zone may be configured to match the shape of a room. Checking 420 whether the user position is in a proximity zone for a location may include testing whether the coordinates of the user position are a member of the set of coordinates defining the proximity zone.

The process 400 includes initiating 430 presentation of the content item based on the user position entering proximity to the location. When the user position transitions from outside to inside of proximity to the location, presentation of the content item associated with the location may be initiated 430. The content item may be presented using a presentation speed that has been adjusted (e.g., using the process 400) based on an indication of motion of the user in the space. The presentation of the content item may continue until entire content item is presented or until the user position exits proximity to the location.

In some implementations, the presentation speed may continue to be adjusted (e.g., using the process 400) during the ongoing presentation of the content item. For example, the presentation speed may continue to be adjusted based on changes in the average velocity of the user over a sliding time window or based on other information about the user's interaction with something (e.g., an exhibit) at the location, such an estimate of a gaze angel of the user. When a presentation speed is adjusted during an ongoing presentation of a content item the adjustment may be implemented through a dampening mechanism to avoid abrupt changes that in the presentation speed. For example, the presentation speed may be updated to an adjusted value in a series of small steps by interpolating the presentation speed from a current value to the adjusted value over an interval of time.

Figure 5:
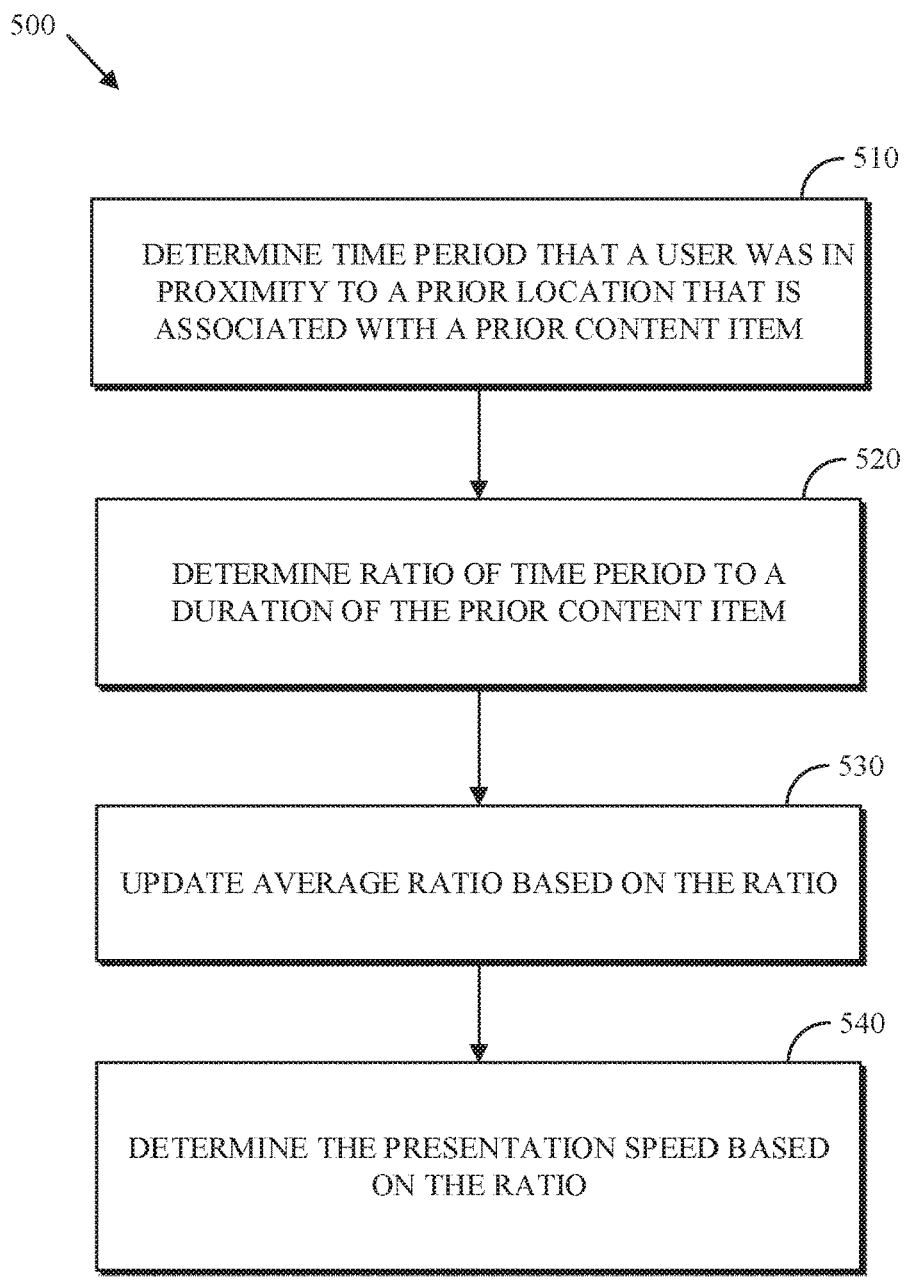
FIG. 5 is a flowchart an example of a process for adapting presentation speed based on motion data for a user.

FIG. 5 is a flowchart an example of a process 500 for adapting presentation speed based on motion data for a user. The process 500 includes determining 510 a time period that a user was in proximity of a prior location in the space, wherein the prior location is associated with a prior content item with a duration; determining 520 a ratio of the time period to the duration; updating 530 an average ratio based on the ratio; and determining 540 the presentation speed based on the ratio. For example, the process 500 may be implemented by the wearable interface 120 of FIG. 1. For example, the process 500 may be implemented by the computing device 200 of FIG. 2.

The process 500 includes determining 510 a time period that a user was in proximity of a prior location in the space. The prior location may be associated with a prior content item with a duration. For example, referring to FIG. 1, the user 110 may have previously moved through the third proximity zone 152 of the third location 150 and through the fourth proximity zone 162 of the fourth location 160, before entering the second proximity zone 142 of the second location 140. A time history of the user positions of user 110 may indicate that the user 110 was in proximity of the third location 150 (e.g., in the third proximity zone 152) for a time period, t_3, and was in proximity of the fourth location 160 (e.g., in the fourth proximity zone 162) for a time period, t_4. In this scenario, the time history of the user positions of the user 110 may be analyzed to determine 510 the time period t_4 and/or the time period t_3. For example, the third location 150 may be associated with a prior content item, CI_3, of duration d_3 and the fourth location 160 may be associated with a prior content item, CI_4, of duration d_4.

The process 500 includes determining 520 a ratio of the time period to the duration. For example, a ratio may be determined 520 for the latest prior location. In the above scenario, a ratio, R_4, for the fourth location 160 may be determined as R_4=t_4/d_4. In some implementations, ratios may also be determined 520 for earlier prior locations. In the above scenario, a ratio, R_3, for the third location 150 may be determined as R_3=t_3/d_3.

The process 500 includes updating 530 an average ratio based on the ratio. For example, an average ratio, R_avg, for the user may be updated 530 based on the ratio for the latest prior location. In the above scenario, latest ratio, R_4, may be used to update 530 the average ratio, R_avg, For example, R_avg may be updated 530 as R_avg[n+1]=α*R_4+(1−α)*R_avg[n], where 0<α<1. In some implementations, a list of ratios for prior locations may be maintained and an average ratio may be updated 530 based on all available ratios for prior locations in the list. In the above scenario, the average ratio may be updated as R_avg=0.5*R_3+0.5*R_4.

The process 500 includes determining 540 the presentation speed based on the ratio. For example, the presentation speed may be determined 540 by scaling a default presentation speed for the content item by a factor that is inversely proportional to the ratio. In some implementations, the presentation speed scale factor is determined 540 as inversely proportional to the ratio for the latest prior location (e.g., R_4 in the above scenario). In some implementations, the presentation speed scale factor is determined 540 as inversely proportional to an average ratio prior locations (e.g., R_avg in the above scenario), which in turn depends on the latest ratio. For example, the presentation speed for the current content item may be determined 540 to be inversely proportional to the average ratio within a range between a minimum presentation speed and a maximum presentation speed. For example, the presentation speed for the current content item may be determined 540 by implementing the process 600 of FIG. 6.

Figure 6:
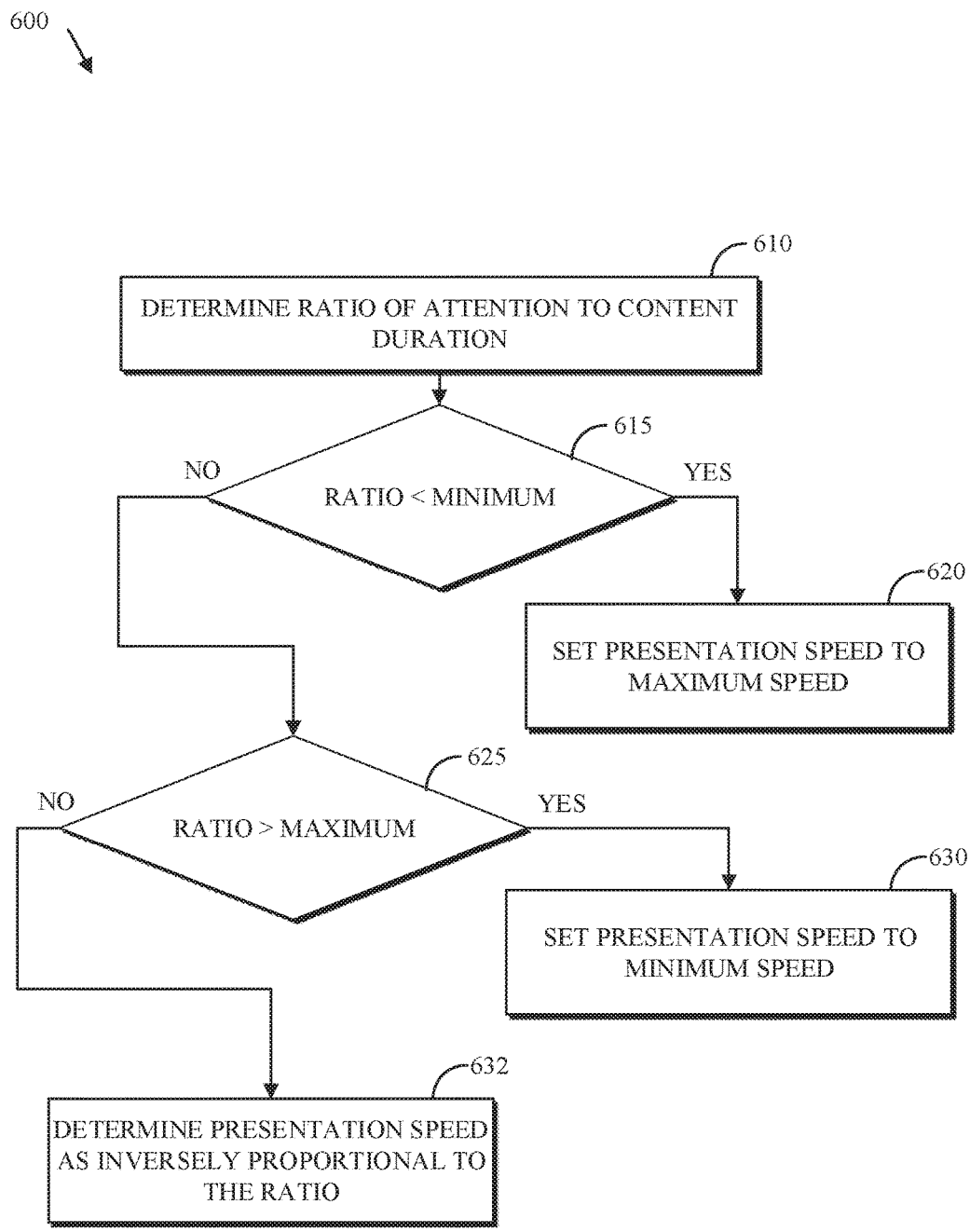
FIG. 6 is a flowchart an example of a process for adapting presentation speed of a content item.

FIG. 6 is a flowchart an example of a process 600 for adapting presentation speed of a content item. The process 600 includes determining the presentation speed to be inversely proportional to the ratio within a range between a minimum presentation speed and a maximum presentation speed. For example, the process 600 may be implemented by the wearable interface 120 of FIG. 1. For example, the process 600 may be implemented by the computing device 200 of FIG. 2.

The process 600 includes determining 610 a ratio of attention to content duration(s). For example, the ratio may be determined 610 as the ratio of linger time t_4 to content duration d_4 for the last prior location (e.g., as described in relation to operation 520). For example, the ratio may be determined 610 as an average of ratios for prior locations (e.g., as described in relation to operation 530).

The process 600 includes checking 615 whether the ratio is below a minimum threshold (e.g., 0.5), and if it is below the threshold, setting 620 the presentation speed to a maximum speed (e.g., 2× the default presentation speed for the content item associated with the current location). Otherwise, the ratio is checked 625 to determine whether the ratio is above a maximum threshold (e.g., 1), and if it is above the threshold, setting 630 the presentation speed to a minimum speed (e.g., the default presentation speed for the content item associated with the current location).

If the (at 615 and 625) the ratio is between the minimum and maximum thresholds, then the presentation speed is determined 632 as inversely proportional to the ratio. For example, the presentation speed may be determined 632 as v_i=v_0_i/R, where v_i is the presentation speed for the content item of the current location, v_0_i is a default presentation speed for the content item of the current location, and R is the ratio.

Figure 7:
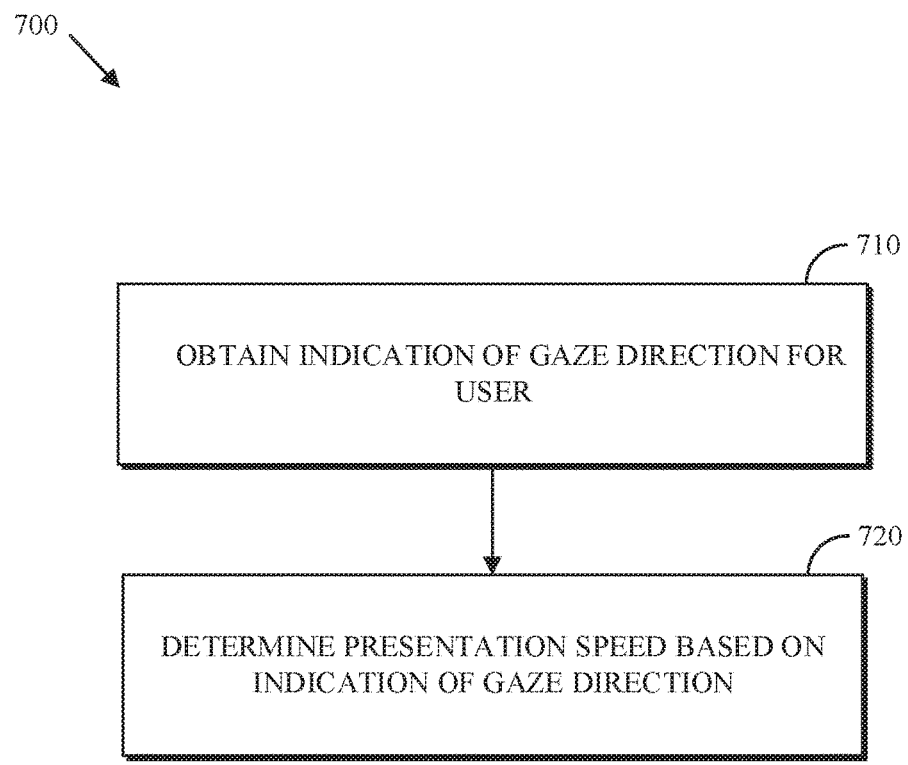
FIG. 7 is a flowchart an example of a process for adapting presentation speed of a content item based on a gaze direction.

FIG. 7 is a flowchart an example of a process 700 for adapting presentation speed of a content item based on a gaze direction. The process 700 includes obtaining 710 an indication of gaze direction for a user; and determining 720 the presentation speed based in part on the indication of gaze direction. For example, the process 700 may be implemented by the wearable interface 120 of FIG. 1. For example, the process 700 may be implemented by the computing device 200 of FIG. 2.

The process 700 includes obtaining 710 an indication of gaze direction for a user. For example, the indication of gaze direction may be obtained 710 by receiving an estimate of gaze direction from an eye tracker (e.g., including the eye tracking sensor 226) in a device worn by the user. In some implementations the indication of gaze direction may be obtained 710 by combining eye orientation data from an eye tracking sensor (e.g., the eye tracking sensor 226) with user head orientation data from a motion sensor (e.g., the motion sensor 220) worn by the user. This orientation data may be combined to obtain 710 a gaze direction expressed in world coordinates of the space. The indication of gaze direction may reflect whether the user is looking in the direction of an object (e.g., a placard for an exhibit or central object at the location) in the proximity of the current location.

The process 700 includes determining 720 the presentation speed based in part on the indication of gaze direction. A ray in the indicated gaze direction from the user position in the space may be checked for intersection with known objects of interest at or near the location. For example, if the indicated gaze direction intersects with a placard for an exhibit associated with the current location, then a presentation speed for a content item associated with the location may be reduced. For example, if the indicated gaze direction points away from the location without intersecting with objects of interest at or near the location, then a presentation speed for a content item associated with the location may be increased. In some implementations, the presentation speed for a content item that is already being presented may be gradually reduced or increased (e.g., by interpolating between a current presentation speed and a new presentation speed that has been determined 720.

What is claimed is:

1. A system for audio presentation, comprising:
a motion sensor;
a speaker;
a memory; and
a processor, wherein the memory stores instructions executable by the processor to cause the system to:
identify audio content associated with a location in a space, the audio content having a primary presentation speed;
obtain, from the motion sensor, an indication of a rate of motion in the space of a user relative to the location;
determine an adjusted presentation speed based on the rate of motion and the primary presentation speed; and
present, via the speaker, the audio content to the user in accordance with the adjusted presentation speed.

2. The system of claim 1, comprising a wearable display and wherein the memory stores instructions executable by the processor to cause the system to:
present, via the wearable display, video content synchronously with the audio content.

3. The system of claim 1, comprising an eye tracking sensor and wherein the memory stores instructions executable by the processor to cause the system to:
obtain, form the eye tracking sensor, an indication of gaze direction for a user; and
wherein the adjusted presentation speed is determined based in part on the indication of gaze direction.

4. The system of claim 1, wherein the memory stores instructions executable by the processor to cause the system to:
determine a user position in the space;
check whether the user position is in proximity to the location; and
initiate presentation of the audio content in response to a determination that a proximity of the user to the location changes from greater than a defined proximity threshold to within the defined proximity threshold.

5. The system of claim 1, wherein the instructions executable by the processor to cause the system to:
determine a time period of proximity between the user and a prior location in the space, wherein the prior location is associated with a prior content item, wherein the prior content item has a duration;
determine a ratio of the time period to the duration; and
determine the adjusted presentation speed based on the ratio.

6. The system of claim 5, wherein the instructions executable by the processor to cause the system to:
determine the adjusted presentation speed to be inversely proportional to the ratio within a range between a minimum presentation speed and a maximum presentation speed.

7. A system for content presentation, comprising:
a memory; and
a processor, wherein the memory stores instructions executable by the processor to cause the system to:
identify a content item associated with a location in a space, the content item having a primary presentation speed;
obtain an indication of a rate of motion in the space of a user relative to the location;
determine an adjusted presentation speed based on the rate of motion and the primary presentation speed; and
present the content item to the user in accordance with the adjusted presentation speed.

8. The system of claim 7, wherein the instructions include instructions executable by the processor to cause the system to:
receive motion data from a motion sensor; and
obtain the indication of the rate of motion based on the motion data.

9. The system of claim 7, wherein the instructions include instructions executable by the processor to cause the system to:
receive image data from a camera, wherein the image data includes views of a user moving in the space; and
obtain the indication of the rate of motion based on received image data.

10. The system of claim 7, wherein the instructions include instructions executable by the processor to cause the system to:
determine the adjusted presentation speed such that the adjusted presentation speed is less than a limit.

11. The system of claim 7, wherein the memory stores instructions executable by the processor to cause the system to:
determine a user position in the space;
check whether the user position is in proximity to the location; and
initiate presentation of the content item in response to a determination that a proximity of the user to the location changes from greater than a defined proximity threshold to within the defined proximity threshold.

12. The system of claim 7, wherein the instructions include instructions executable by the processor to cause the system to:
determine a time period of proximity between the user and a prior location in the space, wherein the prior location is associated with a prior content item, wherein the prior content item has a duration;
determine a ratio of the time period to the duration; and
determine the adjusted presentation speed based on the ratio.

13. The system of claim 12, wherein the instructions include instructions executable by the processor to cause the system to:
determine the adjusted presentation speed to be inversely proportional to the ratio within a range between a minimum presentation speed and a maximum presentation speed.

14. The system of claim 7, wherein the space is a virtual space.

15. The system of claim 7, wherein the space is a real space.

16. The system of claim 7, wherein the content item includes at least one of audio content, video content, or slideshow content.

17. The system of claim 7, wherein the memory stores instructions executable by the processor to cause the system to:
obtain an indication of gaze direction for the user; and
wherein the adjusted presentation speed is determined based in part on the indication of gaze direction.

18. A method for content presentation comprising:
   identifying a content item associated with a location in a space, the content item having a primary presentation speed;
   obtaining an indication of a rate of motion in a the space of a user relative to the location;
   determining, by a processor an adjusted presentation speed based on the rate of motion and the primary presentation speed; and
   presenting the content item to the user in accordance with the adjusted presentation speed.

19. The method of claim 18, comprising:
   determining a user position in the space;
   checking whether the user position is in proximity to the location; and
   initiating presentation of the content item in response to a determination that a proximity of the user to the location changes from greater than a defined proximity threshold to within the defined proximity threshold.

20. The method of claim 18, wherein determining the adjusted presentation speed comprises:
   determining a time period of proximity between the user and a prior location in the space, wherein the prior location is associated with a prior content item, wherein the prior content item has a duration;
   determining a ratio of the time period to the duration; and
   determining the adjusted presentation speed based on the ratio.

* * * * *